UNITED STATES PATENT OFFICE.

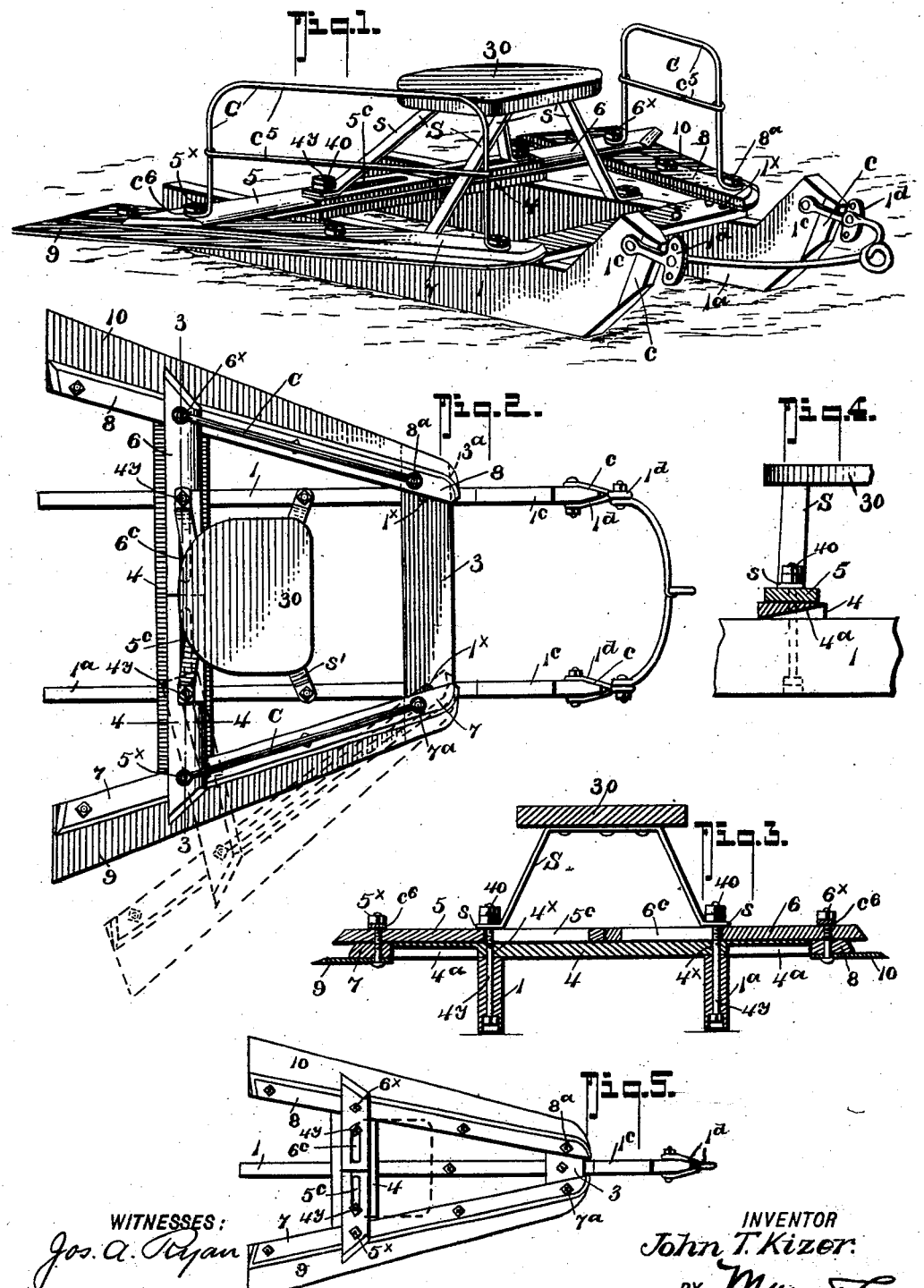

JOHN THOMAS KIZER, OF SENATOBIA, MISSISSIPPI.

STALK-CUTTER.

SPECIFICATION forming part of Letters Patent No. 715,586, dated December 9, 1902.

Application filed May 23, 1902. Serial No. 108,657. (No model.)

*To all whom it may concern:*

Be it known that I, JOHN THOMAS KIZER, residing at Senatobia, in the county of Tate and State of Mississippi, have invented a new and Improved Stalk-Cutter, of which the following is a specification.

My invention is in the nature of an improved means for cutting corn and cotton stalks, pea-vines, and sorghum, and any other grass or vines in drills; and it seeks to provide a cutting means for the purpose stated of a simple and economical construction, which can be easily manipulated and adjusted for use and which will effectively serve for the intended purposes.

In its general nature my invention comprehends a novel construction of runner-frame and laterally-adjustable cutters especially adapted for cutting the stalks or vines planted in drills and to pile the cut or severed portions into every other middle row or trench, and in its more complete make-up it embodies certain details of construction and peculiar combination of parts, all of which will hereinafter be fully described, and specifically pointed out in the appended claims, reference being had to the accompanying drawings, in which—

Figure 1 is a perspective view of my invention. Fig. 2 is a plan view thereof, one of the cutters being shown to a spread or extended position in dotted lines. Fig. 3 is a cross-section taken on the line 3 3 of Fig. 2. Fig. 4 is a detail cross-section on the line 4 4 of Fig. 2. Fig. 5 is a diagram of a modified construction, hereinafter explained.

In the practical construction my invention comprises a pair of runners or slides 1 $1^a$ of suitable length, preferably four feet long, and made up of chilled-iron bars of suitable height and width. At the forward end the runners 1 $1^a$ incline upward at an angle of about ninety degrees and terminate in upwardly-projecting extensions $1^c$ $1^c$, the front edges of which are beveled, as at $c\ c$, for readily penetrating the vines or stalks or other objects to be cut and to freely pass by stumps or other obstructions. The slides 1 $1^a$ are separated a desired distance to suit the rows or drills, preferably about seventeen inches, and they are rigidly held to their correlative positions by cross-braces 3 and 4, also formed of chilled-metal bars.

The braces 3 4, as will be readily seen by reference to Fig. 2, have their ends projected beyond the sides of the members 1 $1^a$, the outer edges of which in practice are preferably beveled, as indicated at $4^a$ in Fig. 4, to freely pass over stumps, &c. The front cross-bar 3 has its end projected beyond the members 1 $1^a$ to provide for conveniently attaching the front end of the cutter-blade-carrying braces 7 8, presently again referred to, and the cross-brace 4 has its end extended beyond the slides 1 $1^a$ to provide a suitable bearing-surface for the adjustable link-bars 5 6, that connect the members 7 8 with the main frame.

The front end of each slide or runner 1 $1^a$ has a clevis-casting $1^d$ $1^d$ for conveniently attaching a draft-bail, as shown. Each end of the front cross-bar 3 has two apertures, the outer ones of which are provided to receive the bolts $7^a$ $8^a$, that pivotally join the cutter-carrying members 7 8 with the main frame, and the other openings are provided to receive the bolts $1^x$, that join the bar 3 with the runners 1 $1^a$.

The front transverse edges of the laterally-extended ends of the cross-bars 3 4 are beveled downwardly to assist in cutting and passing over stumps and the like. The cross-brace 4 is provided with a single bolt-aperture $4^x$ at each end, which receives the bolts $4^y$, that pass up through the runners, through the brace 4, and through the slotted ends of the link-arms 5 6 and the foot portions $s$ of the rear bracket S, that supports the seat 30, the several parts being rigidly retained by the lock and jam nuts 40 40, as shown. The seat 30 is also supported by a front bracket $s'$, the foot portions of which are firmly secured to the upper edge of the slides 1 $1^a$. The adjusting members 5 6 are also formed of metal bars, and they have their outer ends connected by the screw bolts or rivets $5^x$ $6^x$ with the rear ends of the cutter-bars or holders 8 7, respectively, and their inner ends are adjustably held relatively to the main frame by the bolts $4^y$, that pass through their elongated slots $5^c$ $6^c$, as before stated and as clearly shown in Fig. 2.

The cutter-blades 9 10 are each preferably three inches wide at their front end and five inches wide at their rear end, and the said blades are of steel and of about the thickness of any ordinary saw. These blades are bolted on the members 7 8 in any approved manner, and the front end of each cutter-blade is beveled inward at an obtuse angle to provide against presenting an abrupt edge against the objects to be cut, and to facilitate the cutting action the inner edges of the front ends of the cutters begin flush with the outer vertical surfaces of the slides or runners 1 1ª.

From the foregoing description, taken in connection with the accompanying drawings, it is believed the manner in which my improvement operates and its advantages will be readily understood. While the mechanism described and shown is especially adapted for stalk or vine cutting, it can also be readily employed for severing hay and windrowing the same, and when so used a vertically-disposed guard or frame C is employed, one for each cutter, which is mounted lengthwise of the blade-holding members or bars 7 8, as clearly shown in Fig. 1, and the said frame C for lightness and economy in construction is preferably formed of stout wire rods $c^5$ $c^5$, braced together and including foot portions $c^6$ $c^6$, whereby to detachably join the said frame C to the members 7 8.

In Fig. 5 is illustrated diagrammatically a modified form of my invention, in which but a single slide or runner 1 is used, to which the cross-braces 3 and 4 are centrally secured, and to which braces the cutter bars or holders and the adjustable members 5 and 6 and the seat are secured in the same manner in which they are arranged in the preferred construction shown in Figs. 1 and 2. To further facilitate the operation of the machine, the front edges of the members 5 6 are tapered to a cutting edge, as clearly shown in Fig. 4.

Having thus described my invention, what I claim, and desire to secure by Letters Patent, is—

1. The combination with the runners 1 1ª, the front and rear cross-bars 3 and 4, secured to the runners, and having their ends projected laterally therefrom; of the cutter-blades pivotally secured at their front end to the projecting ends of the front cross-bar, the slotted link-arms 5 and 6, pivotally joined at their outer ends with the cutter-blades, and fastener means coöperating with the slotted ends of the arms 5 and 6 for adjustably connecting said arms to the ends of the rear brace-bar 4, substantially as shown and for the purposes described.

2. In a stalk-cutter, the combination of a pair of parallel runners, whose front ends are beveled and extend upwardly, a front cross-bar 3, and a rear cross-bar 4, mounted upon the said runners, and with their ends projected laterally thereof, a horizontally-disposed cutter-blade in each runner pivotally joined at the front end to the lateral extensions of the front cross-bar, a slotted link-arm for the rear end of each cutter-blade, pivotally secured to the cutter-blade and adjustably connected with the rear cross-bar 4, a longitudinally-disposed vertical guard member for each runner, said guard members including apertured foot portion $c^6$, and a single fastening means for each end of the guard for securing the apertures $c^6$ and the coincident ends of the horizontal cutting-blades to the projecting ends of the bars 3 and 4, all being arranged substantially as shown and described.

JOHN THOMAS KIZER.

Witnesses:
R. C. SMITH,
A. A. ROYALL.